(12) United States Patent
Zierer et al.

(10) Patent No.: US 7,745,548 B2
(45) Date of Patent: Jun. 29, 2010

(54) POLYOXYMETHYLENE HOMOPOLYMERS AND COPOLYMERS, AND PRODUCTION AND USE THEREOF

(75) Inventors: Dirk Zierer, Hofheim (DE); Jens Schiebisch, Freigericht (DE); Klaus Kurz, Kelsterbach (DE)

(73) Assignee: Ticona GmbH, Kelsterbach (DE)

( * ) Notice: Subject to any disclaimer, the term of this patent is extended or adjusted under 35 U.S.C. 154(b) by 1096 days.

(21) Appl. No.: 10/570,585

(22) PCT Filed: Sep. 3, 2004

(86) PCT No.: PCT/EP2004/009812

§ 371 (c)(1),
(2), (4) Date: Mar. 29, 2006

(87) PCT Pub. No.: WO2005/023898

PCT Pub. Date: Mar. 17, 2005

(65) Prior Publication Data

US 2007/0027300 A1     Feb. 1, 2007

(30) Foreign Application Priority Data

Sep. 5, 2003    (DE) ................................. 103 40 977

(51) Int. Cl.
    *C08L 59/04*       (2006.01)
    *C08G 2/32*        (2006.01)
    *C08G 65/34*       (2006.01)

(52) U.S. Cl. ....................... 525/469; 528/425; 528/370; 528/371; 428/412

(58) Field of Classification Search ................. 525/469; 528/425, 370, 371; 428/412
See application file for complete search history.

(56) References Cited

U.S. PATENT DOCUMENTS

| | | | |
|---|---|---|---|
| 3,337,503 A | 8/1967 | Schnizer et al. | |
| 3,494,883 A | 2/1970 | Holub et al. | |
| 3,609,124 A | 9/1971 | Ackermann et al. | |
| 4,267,303 A | 5/1981 | König et al. | |
| 4,377,667 A | 3/1983 | Sakurai et al. | |
| 4,808,689 A | 2/1989 | Katz | |

FOREIGN PATENT DOCUMENTS

| | | |
|---|---|---|
| DE | 1 810 453 | 8/1969 |
| DE | 1 795 028 | 1/1972 |
| DE | 0 008 724 A1 | 3/1980 |
| DE | 2 837 526 | 3/1980 |
| DE | 3 123 065 A1 | 3/1982 |
| EP | 0 335 416 A2 | 10/1989 |
| EP | 0 629 644 A2 | 12/1994 |
| JP | 2001-114980 | 4/2001 |
| WO | WO-98/47940 | 10/1998 |
| WO | WO-01/40178 A1 | 6/2001 |
| WO | WO-01/66633 A1 | 9/2001 |

OTHER PUBLICATIONS

Brooks et al., "Urethane Block Copolymer from Polyoxymethylene and Poly(propylene adipate)," *Macromolecular Synheses*, vol. 4, pp. 1.6 (1972).
Xu et al., "Structure-Property Relationships in Thermoplastic Elastomers III. Segmented Polyacetal-Polyurethanes," *Journal of Applied Polymer Science*, vol. 31, pp. 123-133 (1986).
Saechtling, Kinstoff-Taschenbuch, *Plastics Handbook*, Hanser Verlag, 27th ed., 1998, pp. 202-217, (cited in specification at p. 17, lines 19-22).

*Primary Examiner*—Duc Truong
(74) *Attorney, Agent, or Firm*—Dority & Manning, P.A.

(57) ABSTRACT

Homo- or copolyoxymethylenes are described and contain the repeat structural unit of formula I

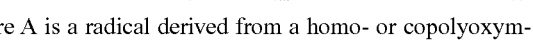

$$-A-O-R^1-O-CO-(R^2-CO-)_m-O- \qquad (I),$$

where A is a radical derived from a homo- or copolyoxymethylene,
$R^1$ is an alkylene radical having at least two carbon atoms, or a cycloalkylene radical,
$R^2$ is a direct carbon-carbon bond, or an alkylene, cycloalkylene, arylene, or aralkylene radical, and
$m$ is 0 or 1.

These polymers may be prepared by reacting end-group-functionalized homo- or copolyoxymethylenes with selected chain-linking agents.

The reaction products can be used to produce moldings.

24 Claims, No Drawings

POLYOXYMETHYLENE HOMOPOLYMERS AND COPOLYMERS, AND PRODUCTION AND USE THEREOF

RELATED APPLICATIONS

This application is a national stage application (under 35 U.S.C. 371) of PCT/EP2004/009812 filed Sep. 3, 2004 which claims benefit to German application 103 40 977.7 filed Sep. 5, 2003.

The present invention relates to novel polyoxymethylenes, and also to their preparation and use, in particular as a molding composition for injection moldings, blow molding, and extrusion, for production of moldings of any kind.

Polyoxymethylene (also termed "POM" below) is a high-performance polymer with good mechanical properties. However, its toughness is unsatisfactory, and in many applications impact modifiers are therefore added to POM. Elastomeric polyurethanes are examples of these.

Attempts have been made previously to influence the impact resistance of POM via controlled incorporation of cocomponents. Examples of these are found in JP-A-2001-114,980 and U.S. Pat. No. 4,808,689.

Macromol. Synth., 4, (1972), 1-6 moreover describes copolymers composed of polyoxymethylene blocks and of polypropylene adipate blocks, which have linkage by way of urethane groups.

J. Appl. Polym. Sci., 31 (1986) 123-133 discloses further polyacetal-polyurethane block copolymers.

Previous POM preparation processes involved cationic polymerization of suitable monomers, such as 1,3,5-trioxane and 1,3-dioxolane. This process does not permit preparation of (co)polymers with very high molecular weights and correspondingly low melt viscosities. Conventional processes can typically prepare homo- or copolyoxymethylenes whose melt index (MVR value at 190/2° C., 2.16 kg, ISO 1133) is not less than 1 cm$^3$/10 min.

Production of high-molecular-weight polymers via use of chain-linking agents is in principle known.

Chain-linkage of polyamides or of polyesters or of polyesteramide block copolymers is known from WO-A-98/47,940, the chain-linking agent used here comprising a selected carbonyl N,N'-bis(lactamate). WO-A-01/40,178 and WO-A-01/66,633 describe similar processes. According to this latter specification, chain-linkage can be applied to polyamides, polyesters, polycarbonates, and polyether polyols. Polyoxymethylene is also mentioned alongside polyethylene glycol or polytetramethylene glycol as an example of polyether polyols.

Finally, DE-A-2,837,526 discloses a process for preparation of polymers having diphenol carbonate end groups. This process involves, inter alia, reacting polyetherdiols of moderate molecular weight with bisaryl esters of carbonic acid and with diphenols.

Starting from this prior art, the present invention provides novel homo- and copolyoxymethylenes.

The invention is based on the discovery that selected homo- or copolyoxymethylenes which are hydroxy-terminated using specific end groups can react with selected chain-linking agents to give homo- or copolymers with high molecular weights.

Processes have moreover been found permitting chain-linkage of homo- and copolyoxymethylenes with high melt index values, giving homo- and copolyoxymethylenes with high molecular weights and correspondingly low melt indices.

The invention provides homo- or copolyoxymethylenes containing the structural unit of formula I

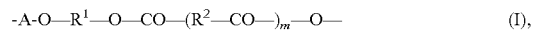

$$-A-O-R^1-O-CO-(R^2-CO-)_m-O-\quad(I),$$

where A is a radical derived from a homo- or copolyoxymethylene, $R^1$ is an alkylene radical having at least two carbon atoms, or a cycloalkylene radical, $R^2$ is a direct carbon-carbon bond, or an alkylene, cycloalkylene, arylene, or aralkylene radical, and m is 0 or 1.

For the purposes of this description, an alkylene radical is a divalent branched or straight-chain aliphatic radical. Alkylene radicals can contain, incorporated into the main alkylene chain, heteroatoms and/or radicals inert under the conditions of preparation and processing, or can contain inert radicals which are substituents of the main chain.

Examples of inert radicals incorporated into the main alkylene chain are arylene radicals, such as ortho-, meta-, or preferably para-phenylene radicals, cycloalkylene radicals, such as cyclohexylene, or heteroatoms, such as nitrogen N-substituted with monovalent organic radicals, silicon substituted with monovalent organic radicals, other examples being sulfur or in particular oxygen. The expression "inert radicals incorporated into the main alkylene chains" means that the inert radicals have been incorporated into the main chain but not at its ends.

Examples of substituents of the main alkylene chain are alkyl, cycloalkyl, aryl, or aralkyl radicals, or inert groups or atoms covalently bonded to the main alkylene chain. Among these are halogen atoms, such as chlorine, alkoxy groups, such as methoxy or ethoxy, aryl groups, such as phenyl, or aralkyl groups, such as benzyl.

For the purposes of this invention, the molar masses of alkylene radicals are up to 1000 g/mol, preferably from 14 to 500 g/mol.

Alkylene radicals $R^1$ have to have at least two carbon atoms, whereas alkylene radicals $R^2$ can also have one carbon atom.

For the purposes of this description, a cycloalkylene radical is a divalent cycloaliphatic radical which usually contains from five to eight carbon atoms. Cycloalkylene radicals preferably have from five to six ring-carbon atoms, and can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an arylene radical is a divalent aromatic hydrocarbon radical, usually containing from six to fourteen carbon atoms. Arylene radicals are preferably phenylene or naphthylene radicals, and can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an aralkylene radical is a divalent araliphatic radical which usually contains from seven to ten carbon atoms. Benzylidene is preferred. Aralkylene radicals can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an alkyl radical is a monovalent branched or straight-chain aliphatic radical which usually contains from one to fifty, preferably from one to thirty, and particularly preferably from one to ten, carbon atoms. Alkyl radicals can contain further groups which are inert under the conditions of preparation and processing, these being monovalent substituents or having been incorporated into the main chain. Examples of these have been listed at an earlier stage above during the description of the alkylene radicals. Preferred examples of substituents are halogen atoms, such as chlorine, alkoxy groups, such as methoxy or ethoxy, aryl groups, such as phenyl, or aralkyl groups, such as benzyl.

For the purposes of this description, a cycloalkyl radical is a monovalent cycloaliphatic radical which usually contains from five to eight carbon atoms. Cycloalkyl radicals preferably contain from five to six ring-carbon atoms, and can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an aryl radical is a monovalent aromatic hydrocarbon radical which usually contains from six to fourteen carbon atoms. Aryl radicals are preferably phenyl or naphthyl, and can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

For the purposes of this description, an aralkyl radical is a monovalent araliphatic radical which usually contains from seven to ten carbon atoms. Benzyl is preferred. Aralkyl radicals can contain further groups which are inert under the conditions of preparation and processing, e.g. halogen atoms, such as chlorine, alkyl groups, such as methyl or ethyl, alkoxy groups, such as methoxy or ethoxy, aryl groups, such as phenyl, or aralkyl groups, such as benzyl.

The inventive homo- or copolyoxymethylenes contain radicals A derived from homo- or copolyoxymethylenes, linked to one another by means of specific chain-linking agents.

The radicals A are homo- or copolyoxymethylenes which are intended for chain-linkage and whose end groups have been removed. At each end of a radical A there are carbon atoms which bear end groups or which have linkage to at least one other radical A by way of chain-linking agent.

The content of the radicals A derived from homo- or copolyoxymethylenes in the inventive homo- or copolyoxymethylenes is usually more than 90% by weight, preferably more than 95% by weight, based on the inventive homo- or copolyoxymethylenes.

The remaining structural units of the inventive homo- or copolyoxymethylene derive from the chain-linking agents used and also from the end groups of the homo- or copolyoxymethylenes —O—$R^1$—OH used for the chain-linking process, and, if appropriate, contain other structural units, such as end groups different from —O—$R^1$—OH, e.g. methoxy, ethoxy, propoxy, butoxy, formate, or acetate.

The polyoxymethylene radicals A ("POM radicals") are generally unbranched linear blocks which generally contain, based on the radical A, at least 50 mol %, preferably at least 80 mol %, in particular at least 90 mol %, of oxymethylene units (—$CH_2$—O—).

The molecular weights of the POM radicals A in the inventive copolymers can vary widely. These radicals typically have repeat structural units of the formula —($CH_2$—O—)$_x$, where x is from 100 to 10 000, preferably from 300 to 3000.

The term polyoxymethylene radicals here encompasses not only radicals derived from homopolymers of formaldehyde or of its cyclic oligomers, for example of trioxane or of tetraoxane, but also radicals derived from copolymeric components.

Copolyoxymethylene radicals are polymer components which derive from formaldehyde or from its cyclic oligomers, in particular from trioxane, and from cyclic ethers, from aldehydes, such as esters of glyoxylic acid, from cyclic acetals which, if appropriate, can have substitution, and/or from linear oligo- or polyacetals.

The preparation of these homo- or copolyoxymethylene radicals is known per se to the person skilled in the art and is described in the literature. These polymer radicals very generally contain at least 50 mol % of —$CH_2$—O— repeat units in the main polymer chain.

The homopolymer radicals generally derive from formaldehyde or trioxane via polymerization, preferably in the presence of suitable catalysts.

Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan, and 1,3,6-trioxocane as cyclic ethers, and also of linear oligo- or polyformals, such as polydioxolane or polydioxepan, as cocomponents.

Preference is given to copolyoxymethylenes A in which polyoxymethylene radicals having from 99.9 to 90 mol % of repeat structural units of the formula —($CH_2$—O—)$_x$, preferably derived from trioxane, and from 0.1 to 10 mol % of repeat structural units derived from one of the abovementioned comonomers are present.

Particular preference is given to copolyoxymethylenes A in which polyoxymethylene blocks having from 99.9 to 90 mol % of repeat structural units of the formula —($CH_2$—O—)$_x$, preferably derived from trioxane, and from 0.1 to 10 mol % of repeat structural units of the formula

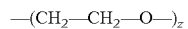

where z is a whole number which is at least 1.

Other suitable POM radicals A are repeat structural units which by way of example are prepared via reaction of trioxane, and of one of the cyclic ethers described above, with a third monomer, preferably a bifunctional compound of the formula

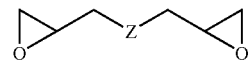

where Z is a chemical bond, —O—, or —O—$R^3$—O— ($R^3$=$C_2$-$C_8$-alkylene or $C_2$-$C_8$-cycloalkylene).

Preferred monomers of this type are ethylene diglycide, diglycidyl ether, and diethers composed of glycidyl compounds and formaldehyde, dioxane, or trioxane in a molar ratio of 2:1, and also diethers composed of 2 mol of glycidyl compound and 1 mol of an aliphatic diol having from 2 to 8 carbon atoms, e.g. the diglycidyl ethers of ethylene glycol, 1,4-butanediol, 1,3-butanediol, 1,3-cyclobutanediol, 1,2-propanediol, and 1,4-cyclohexanediol, to mention just a few examples.

The homo- or copolyoxymethylenes A are substantially linear and contain at least 50%, preferably from 60 to 100%, of end groups of the formula —O—$R^1$—OH, where $R^1$ is as defined at an earlier stage above. Very small amounts of branching agents can be used, if desired. The amount of branching agents is usually not more 1% by weight, based on the total amount of monomer used to prepare the POM radicals A, preferably not more than 0.3% by weight.

$R^1$ derives from an aliphatic or cycloaliphatic diol HO—$R^1$—OH.

$R^1$ is preferably a radical of the formula —$C_nH_{2n}$—, where n is a whole number from 2 to 6. Particularly preferred radicals $R^1$ are —$(CH_2)_4$—, —$(CH_2$—$CH(CH_3))$—, —$(CH_2$—$CH_2$—$O)_x$—$CH_2$—$CH_2$—, and very particularly preferably —$CH_2$—$CH_2$—, where x is a whole number from 1 to 20.

The end groups —O—$R^1$—OH can be produced during preparation of the POM starting compounds via addition of diols HO—$R^1$—OH to the polyacetal-forming monomer(s), the end groups —O—$R^1$—OH being formed here via chain transfer. Instead of this, a copolyoxymethylene containing —O—$R^1$—O— units can be degraded via solution hydrolysis, e.g. in methanol/water with triethylamine, or via melting hydrolysis, e.g. via thermal degradation in an extruder, thus producing —O—$R^1$—OH end groups.

According to the invention, the homo- or copolyoxymethylene starting products of the structure $R^4$—O-A-$R^1$—OH, where A is defined as above and $R^4$ is an end group, preferably —O—$R^1$—OH, are linked by way of selected chain-linking agents, which form the structural element —O—CO—($R^2$—CO—)$_m$—O—.

$R^4$ can be any desired end groups of homo- or copolyoxymethylenes. Examples of these are groups of the formulae —OH, —O—$R^5$, —O—CO—$R^6$, or in particular groups of the formula —O—$R^1$—OH, where $R^1$ is as defined at an earlier stage above, $R^5$ is an alkyl, cycloalkyl, aryl, or aralkyl radical, and $R^6$ is hydrogen or an alkyl, cycloalkyl, aryl, or aralkyl radical.

Two or more radicals A are linked to one another via the chain-linkage reaction and then have the structure of the formula Ia, or repeat structural units of the formula Ib, or repeat structural units of the formula Ic

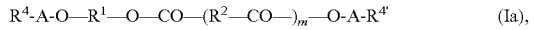     (Ia),

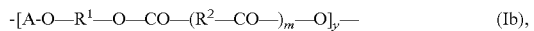     (Ib),

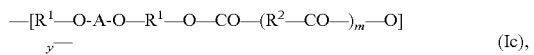     (Ic), where A, $R^1$, $R^2$, $R^4$, and m are defined as at an earlier stage above, $R^{4'}$ assumes one of the definitions given for $R^4$, and y is a whole number which is at least 2.

The chain-linking agents are derivatives of carbonic acid, e.g. esters of carbonic acid, or activated urea derivatives, or esters or half-esters of dicarboxylic acids, or dianhydrides of tetracarboxylic acids. A factor to be considered in selection of the chain-linking agents is that these have at least some solubility in the reaction mixture under the conditions of processing or reaction, and are therefore available for a chain-linkage reaction. For the purposes of this description "sufficiently soluble" means solubility of at least 1 mmol/kg.

Preference is given to diesters of aromatic or aliphatic dicarboxylic acids, or in particular to diesters of carbonic acid, diaryl esters being very particularly preferred.

One preferred example of a diaryl ester of carbonic acid is diphenyl carbonate.

Preference is likewise given to diesters of oxalic acid, in particular the diphenyl ester or the dimethyl ester.

Preferred examples of diesters of aromatic dicarboxylic acids are diphenyl esters of dimethyl esters of isophthalic acid or of terephthalic acid.

Preferred examples of diesters of aliphatic dicarboxylic acids are diphenyl esters or dimethyl esters of adipic acid or of sebacic acid.

One preferred example of a dianhydride of tetracarboxylic acids is oxybis(phthalic anhydride).

One preferred example of an activated urea derivative is carbonyl N,N'-bis(caprolactamate).

Preference is given to homo- or copolyoxymethylenes where $R^1$ is —$CH_2$—$CH_2$—.

Preference is likewise given to homo- or copolyoxymethylenes where m=0.

Preference is likewise given to homo- or copolyoxymethylenes where m=1 and $R^2$ is a phenylene radical or a radical of the formula —$C_rH_{2r}$— or a chemical bond, where r is a whole number from one to ten.

The preparation of the inventive homo- or copolyoxymethylenes is based on the discovery that homo- or copolyoxymethylenes having selected end groups can react in the presence of selected chain-linking agents and with use of selected catalysts to give homo- or copolyoxymethylenes with increased molecular weight.

The invention also provides a process for chain-linkage of homo- or copolyoxymethylenes, encompassing the reaction of homo- or copolyoxymethylenes of the formula II with at least one chain-linking agent of the formula III

     (II),

     (III), where A, $R^1$, $R^2$, $R^4$, and m are as defined above, and $R^7$ and $R^8$, independently of one another, are alkoxy, cycloalkoxy, aryloxy, aralkyloxy, or a lactam radical bonded by way of the nitrogen atom, or where, in the case where m=1, $R^7$ and/or $R^8$ together with another carboxylic acid group of the radical $R^2$ form an anhydride group or imide group.

The chain-linkage reaction is usually carried out in the presence of catalysts which promote the formation of covalent bonds between the end groups —O—$R^1$—OH or the homo- or copolyoxymethylenes of the formula II and the chain-linking agent of the formula III. These are Lewis acids or Lewis bases.

Typically catalysts which can be used according to the invention are compounds which catalyze transesterification reactions or catalyze formation of ester groups.

According to the invention, the amounts used of these catalysts are from 0.1 ppm to 10 000 ppm, in particular from 1 ppm to 1000 ppm, based on the reaction mixture.

Examples of suitable Lewis-acid catalysts are LiX, $Sb_2O_3$, $GeO_2$, $BX_3$, $MgX_2$, $BiX_3$, $SnX_4$, $SbX_5$, $FeX_3$, $GeX_4$, $GaX_3$, $HgX_2$, $ZnX_2$, $AlX_3$, $PX_3$, $TiX_4$, $MnX_2$, $ZrX_4$, $[R_4N]^+_qA^{q-}$, $[R_4P]^+_qA^{q-}$, where X can be a halogen atom, i.e. I, Br, Cl, F and/or an —O—R or —R group, where R is alkyl, cycloalkyl, aryl or aralkyl, q is a whole number from 1 to 3, and A is a q-valent anion, such as halide, sulfate, or carboxylate, or else sulfonium salts or titanyl compounds.

Examples of suitable Lewis-base catalysts are metal salts of carboxylic acids, preferably the alkali metal salts and alkaline earth metal salts, in particular the lithium salts, such as lithium versatate; or complexes of metals with acetylacetone, preferably the alkali metal complexes and alkaline earth metal complexes, in particular lithium acetylacetonate; or alkoxides or phenolates of metal salts, preferably of alkali metals or of alkaline earth metals; or tertiary amines, in particular trialkylamines or cyclic tertiary amines, such as diazabicyclo[2.2.2]octane (DABCO), dimethylaminopyridine (DMAP), guanidine, or morpholine; or organotin compounds, such as dibutyltin dilaurate, dibutyltin bis(2-ethylhexanoate), dibutyltin dibutyrate, dibutyltin dimethoxide, dibutyltin dioctanoate, or stannous ethylhexanoate.

It is also possible to use mixtures of various catalysts.

It is particularly preferable to use lithium acetylacetonate, sodium phenolate, sodium methoxide, lithium methoxide, lithium chloride, or sodium acetylacetonate.

The homo- or copolyoxymethylenes of the formula II can be prepared by processes known per se.

To this end, a monomer forming —$CH_2$—O— units or a mixture of various monomers is (co)polymerized with conventional catalysts, if appropriate together with a solvent and/or with regulators, at a temperature of from −78° C. to 300° C., either at atmospheric pressure or at pressures up to 500 bar, for example at pressures of from 2 to 500 bar. Another possibility is anionic polymerization of formaldehyde, where O—$R^1$—OH end groups can be introduced via reaction with ethylene oxide.

Examples of monomers forming —$CH_2$—O— units have been listed at an earlier stage above.

In bulk polymerization, the polymerization mixture is fluid or solidifies in the case of polymerization at atmospheric pressure during the course of the polymerization reaction. As an alternative to this, however, operations can also be carried out in inert solvents. Examples of these are aliphatic, cycloaliphatic, halogenated aliphatic hydrocarbons, glycol ethers, or cyclic ethers, such as THF or 1,4-dioxane.

The molecular weight of the polymers of the formula II can, if appropriate, be adjusted via use of the regulators known per se in POM preparation.

Examples of regulators are dihydric alcohols of the formula HO—$R^1$—OH, where $R^1$ is as defined at an earlier stage above, and also very small amounts of water. These alcohols, or the water, can function as chain-transfer agents. The amounts usually used of the regulators are up to 50 000 ppm, preferably from 100 to 3000 ppm.

Catalysts or initiators that can be used are the cationic initiators usually used in preparation of homo- or copolyoxymethylenes. Examples of these are protic acids, such as fluorinated or chlorinated alkyl- and arylsulfonic acids, e.g. trifluoromethanesulfonic acid, trifluoromethanesulfonic anhydride, or Lewis acids, e.g. stannic tetrachloride, arsenic pentafluoride, phosphorus pentafluoride, and boron trifluoride, and also their complexes and compounds of salt type, e.g. boron trifluoride etherates and triphenylmethyl hexafluorophosphate.

The usual amounts used of the catalysts or initiators are from 0.01 to 1000 ppm, preferably from 0.03 to 100 ppm, based on the monomer (mixture).

According to the invention, pressure and temperature in the polymerization zone are to be selected in such a way that monomers and polymer are in homogeneous or finely dispersed distribution, preferably being completely dissolved in one another or at least being so finely distributed as to form a dispersion which still permits incorporation of the monomers. This is the case with the values stated above for the reaction pressure and the reaction temperature.

The preferred polymerization temperature is from 70 to 200° C., either at atmospheric pressure or at pressures of from 5 to 50 bar.

The polymerization time can vary widely, and is typically in the range from 0.1 to 20 minutes. The polymerization time is preferably from 0.4 to 5 minutes.

The polymerization reaction can take place in the reactors known for preparation of homo- or copolyoxymethylenes. Typical equipment used is kneaders, extruders, or tubular reactors designed with static mixers, where these permit control of temperature and have pressure-tight design.

Further treatment of the polymerization mixture after the polymerization reaction takes place in a manner conventional per se. The polymerization reaction is usually followed by deactivation, devolatilization, and compounding of the mixture.

Deactivation takes place via addition of deactivators to the reaction mixture. Examples of these are ammonia, amines, alcohols, salts having basic reaction, or else water.

To introduce the —O—$R^1$—OH end groups, use can be made of copolyoxymethylenes containing —O—$R^1$—O— groups, in which these end groups are produced via hydrolysis. This typically takes place in the context of the abovementioned deactivation in an alkaline environment or via controlled thermal degradation of terminal —($CH_2$—O)— units until a —$R^1$—O— unit arises.

However, the —O—$R^1$—OH end groups can be produced before preparation of the homo- or copolyoxymethylenes of the formula II is complete, by adding very small amounts of diols HO—$R^1$—OH to the polyacetal-forming monomer(s), so that the —O—$R^1$—OH end groups are produced via chain transfer and repeat structural units derived from the polyacetal-forming monomers form in the interior of the chain.

The compounds of the formulae II and III can be reacted in any desired reactors, for example in stirred tanks, in static mixers, or in particular in extruders or in kneaders.

To this end, the compounds of the formulae II and III are preferably introduced together with the respective catalyst individually or in the form of a mixture into the reactor, and are reacted with one another in a stream of gas and/or in vacuo.

Treatment in the stream of gas and/or in vacuo accelerates the reaction, giving a corresponding reduction in reaction times.

Gases that can be used are any of the gases which do not degrade, or do not significantly degrade, the reaction mixture. Examples of these are air or preferably inert gases, such as nitrogen or noble gases.

Preferred catalysts for fro the chain-linkage reaction are the alkali metal or alkaline earth metal salts of acetylacetonates, in particular lithium acetylacetonate or sodium acetylacetonate, and/or alkali metal salts of alkoxides or of phenolates, in particular sodium phenolate, sodium methoxide, or lithium methoxide, and/or lithium halides, in particular lithium chloride.

The reaction temperatures are typically above 60° C., preferably from 100 to 240° C., in particular from 150 to 220° C.

The reaction time is typically from 0.5 to 60 minutes.

The amounts selected of the compounds of the formulae II and III can vary widely. The amount used of homo- or copolyoxymethylene of the formula II, per mole of chain-linking agent of the formula II, is typically such that the content of the end groups —O—$R^1$—OH present at the start of the chain-linkage reaction is in the range from one quarter of one mol to four mol.

The molar ratio of chain-linking agent to the —O—$R^1$—OH end groups present at the start of the chain-linkage reaction is preferably from 1:1 to 1:2.

In one embodiment of the inventive process, the reaction takes place via mixing of the compounds of the formulae II and III, if appropriate of the catalyst, and if appropriate of other additives, and via heat-treatment of the mixture in the stream of gas and/or in vacuo for sufficient time to achieve the desired molecular-weight increase. Temperatures selected here are such that the reaction mixture is liquid or such that a liquid phase forms in the reaction mixture.

In another embodiment of the inventive process, from a mixture of the compounds of the formulae II and III, if appropriate of the catalyst, and if appropriate of other additives, a molded structure is first produced. This is then heat-treated in a stream of gas and/or in a vacuum for a period sufficient to achieve the desired molecular-weight increase. The temperatures selected here are such that the reaction mixture is solid.

This solid-phase reaction permits production of moldings which are composed of polyoxymethylene with very high molecular weight and which are not processable, or processable only with difficulty, in conventional shaping devices, such as extruders.

It is, of course, also possible to treat pelletized POM via this solid-phase reaction.

A feature of the inventive homo- or copolyoxymethylenes comprising the structural units of the formula I, when compared with the starting materials of the formula II, is an increased molecular weight, and this is discernible in a reduction in the melt index, while the melting points of the products do not change, or do not change substantially, when compared with those of the starting materials. The inventive chain-linkage reaction typically at least halves the melt index of the respective starting materials used.

Typical melt indices (MVR values, 190° C./2.16 kg, ISO 1133) of the homo- or copolyoxymethylenes chain-linked according to the invention are in the range below 50 cm$^3$/10 min, preferably below 10 cm$^3$/10 min, and very particularly below 2 cm$^3$/10 min.

The melt indices (MVR values, 190° C./2.16 kg, ISO 1133) of the homo- or copolyoxymethylenes used of the formula II are generally more than 2 cm$^3$/10 min, preferably from 5 to 200 cm$^3$/10 min, in particular from 24 to 70 cm$^3$/10 min. The melting points of the homo- or copolyoxymethylenes used of the formula II are typically in the range from 100 to 175° C. (measured by DSC with heating rate of 10 K/min).

The inventive homo- or copolyoxymethylenes can be used for moldings of any type, in particular for producing fibers, films, hoses, pipes, rods, or profiles.

The inventive homo- or copolyoxymethylenes can be processed via blow molding, injection molding, or extrusion, or molecular-weight increase can be achieved on previously shaped products.

The invention therefore also provides the use of the homo- or copolyoxymethylenes for the abovementioned purposes.

Because the inventive homo- or copolyoxymethylenes have increased molecular weight when comparison is made with conventional homo- or copolyoxymethylenes, the use of impact modifiers, for example of elastomeric polyurethanes, is not an essential requirement. However, these components can be added in a particular instance as a function of the intended application.

The inventive homo- or copolyoxymethylenes can comprise other additives known per se, which can be added during, or after, preparation of the homo- or copolyoxymethylenes.

Examples of additives are processing aids, such as antioxidants, acid scavengers, formaldehyde scavengers, UV stabilizers, heat stabilizers, adhesion promoters, lubricants, nucleating agents, or mold-release agents, fillers, reinforcing materials, or antistatic agents; or additives giving the molding composition a desired property, e.g. dyes and/or pigments, and/or impact modifiers, and/or additives conferring electrical conductivity; and also mixtures of these additives, but without restricting scope to the examples mentioned.

A possible method of processing the inventive homo- or copolyoxymethylenes is mixing of the fine-particle, for example pulverulent or granulated, components and subsequent thermoplastic processing, or mixing of the components in heatable mixing assemblies suitable for this purpose. Suitable mixing assemblies and mixing processes are described by way of example in: Saechtling, Kunststoff-Taschenbuch [Plastics handbook], Hanser Verlag, 27th edition, 1998, pp. 202-217, incorporated herein by way of reference.

Advantageous processing temperatures are usually in the range from 180 to 230° C., in particular from 190 to 210° C.

The examples below illustrate, but do not restrict, the invention. Unless otherwise stated, amounts stated here are always in parts by weight.

Characterization of POM Powders Used

End-group analysis of the POM powders used for the experiments below in [mmol/kg] measured by $^1$H NMR spectroscopy in deutero-hexafluoroisopropanol:

| Name | Comments | Methoxy —OCH$_3$ | Formate —OOCH | Hemiacetal —OCH$_2$OH | Glycol —OCH$_2$CH$_2$OH |
|---|---|---|---|---|---|
| POM-OH I | After hydrolysis | 16 | 0 | 0 | 33 |
| POM-OH II | After hydrolysis | 8.5 | 0 | 0.8 | 53 |

Characterization of Chain-Linking Agents and Catalysts Used

Physical data and abbreviations for the chain-linking agents and catalysts used:

| Chain-linking agent | Abbreviation | CAS No. | Molar mass | Melting point |
|---|---|---|---|---|
| Carbonyl N,N'-bis (caprolactamate) | CBC | 194494-73-6 | 252.31 g/mol | 108-118° C. |
| Diphenyl carbonate | DiPhCO | 102-09-0 | 214.22 g/mol | 79-80° C. |
| Magnesium stearate | Mg stearate | 557-04-0 | 591.3 g/mol | 200° C. |
| Lithium acetylacetonate | Li(acac) | 18115-70-3 | 106.05 g/mol | 250° C. |
| Sodium acetylacetonate hydrate | Na(acac) | 86891-03-4 | 140.12 g/mol | 230° C. |
| Sodium phenolate trihydrate | NaOPh | 156150-40-2 | 170.14 g/mol | 61-64° C. |
| Sodium methoxide | NaOMe | 124-41-4 | 54.02 | — |
| Lithium chloride | LiCl | 7447-41-8 | 42.39 | 610° C. |

EXAMPLES K0-K19

Kneading Experiments

Kneading Experiments with Brabender Kneader for Chain-Extension of POM:

The starting materials (POM powders, stabilizers, chain-linking agents, and catalyst: 50 g in total) were premixed in a plastic bag.

The barrel temperature of the kneading chamber of a Brabender PlastiCorder was set at 200° C., and a feed hopper (accessory of the Brabender kneader) was placed on the kneading chamber. As soon as the barrel temperature had reached 190° C., the powder mixture (50 g in total) was charged to the hopper while the kneader was running (40 rpm), and was then injected into the kneading chamber via an inserted displacer (wedge-shaped ram) using an applied weight of 5 kg. The mixture began to melt, and as soon as the melting process had concluded (brief reduction in torque), the feed hopper was removed and in its place the cover with flushing gas inlet and exhaust gas tube was superposed. Recording of torque then began, and was terminated after a total of 60 minutes (from input of the powder mixture). Once the kneader chamber had been opened, the reaction mixture was removed for further investigation and characterization.

Tables 1a and 1b below list the formulations used, and also the results of characterization after 1 hour of kneading.

TABLE 1a

Formulations for kneading experiments

| Experiment No. | Chain-linking agent | Amount of CLA [%]/(mmol/kg) | Catalyst | Amount of Cat. [%]/(mmol/kg) |
|---|---|---|---|---|
| K 0 * | None | — | None | — |
| K 1 * | DiPhCO | 1.07 (49.9) | Mg stearate | 0.06 (1.01) |
| K 2 * | DiPhCO | 1.07 (49.9) | Li(acac) | 0.02 (1.89) |
| K 3 * | CBC | 1.25 (49.5) | Mg stearate | 0.06 (1.01) |
| K 4 * | CBC | 1.25 (49.5) | Li(acac) | 0.02 (1.89) |
| K 5 * | CBC | 1.25 (49.5) | Li(acac) | 0.02 (1.89) |
| K 6 * | CBC | 0.75 (29.7) | Li(acac) | 0.02 (1.89) |
| K 7 * | CBC | 1.25 (49.5) | Li(acac) | 0.02 (1.89) |
| K 8 * | CBC | 1.25 (49.5) | Li(acac) | 0.02 (1.89) |
| K 9 * | DiPhCO | 1.07 (49.9) | Li(acac) | 0.02 (1.89) |
| K 10 * | DiPhCO | 0.64 (29.9) | Li(acac) | 0.02 (1.89) |
| K 11 * | DiPhCO | 0.64 (29.9) | Li(acac) | 0.02 (1.89) |
| K 12 * | DiPhCO | 0.64 (29.9) | Li(acac) | 0.02 (1.89) |
| K 13 ** | DiPhCO | 1.0 (46.7) | Li(acac) | 0.02 (1.89) |
| K 14 ** | DiPhCO | 0.75 (35.0) | Li(acac) | 0.02 (1.89) |
| K 15 ** | DiPhCO | 0.75 (35.0) | Li(acac) | 0.01 (0.94) |
| K 16 ** | DiPhCO | 0.75 (35.0) | Na(acac) | 0.03 (2.00) |
| K 17 ** | DiPhCO | 0.75 (35.0) | NaOPh | 0.03 (2.00) |
| K 18 ** | DiPhCO | 0.75 (35.0) | NaOMe | 0.01 (2.00) |
| K 19 ** | DiPhCO | 0.75 (35.0) | LiCl | 0.01 (2.00) |

* POM-OH I powder (MVR 2.16 kg/190° C. = 34 ml/10 min) + main stabilizer system, composed of Irganox 246 and Licowax C;
** POM-OH II powder (MVR 2.16 kg/190° C. = 41 ml/10 min) + main stabilizer system.

TABLE 1b

Characterization of products after 1 hour of kneading at 200° C.

| Experiment No. | Brabender Test [ppm/h] | Max. torque [Mm] | $MVR_{calculated}$* [ml/10 min] | MVR [ml/10 min] |
|---|---|---|---|---|
| K 0 | 83 | 1.20 | 35.1 | 34.8 |
| K 1 | 166 | 1.57 | 23.1 | 25.8 |
| K 2 | 0 | 4.66 | 4.3 | 4.2 |
| K 3 | 180 | 2.0 | 16.0 | 17.6 |
| K 4 | 1073 | 8.0 | 1.9 | 1.5 |
| K 5 | about 600 | 6.3 | 2.4 | 1.3 |
| K 6 | 447 | 6.5 | 2.3 | 1.3 |
| K 7 | about 1300 | 6.2 | 2.5 | 1.6 |
| K 8 | about 1300 | 6.4 | 2.4 | 1.3 |
| K 9 | 0 | 3.5 | 6.4 | 4.6 |
| K 10 | 1394 | 9.0 | 1.3 | 1.0 |
| K 11 | about 1500 | 7.6 | 1.8 | 1.3 |
| K 12 | 882 | 8.0 | 2.1 | 1.1 |
| K 13 | 840 | 14.9 | n.d. | 0.26 |
| K 14 | 1260 | 16.0 | n.d. | 2.5** |
| K 15 | 609 | 16.1 | n.d. | 1.7** |
| K 16 | 0 | 11.6 | 2.0 | 18.1** |
| K 17 | 1060 | 13.2 | 1.3 | 8.5** |
| K 18 | 1106 | 14.7 | n.d. | 4.1** |
| K 19 | 605 | 8.0 | 2.0 | 1.8 |

*From torque (by way of experimentally determined calibration curve).
**MVR 15 kg/190° C.

EXAMPLES E0-E3

Extrusion Experiments for Chain-Extension of POMO

The experiments were carried out on a Berstorff ZE 25 twin-screw extruder. An MD 8 C Vacuubrand membrane pump was attached to the vacuum dome. The starting materials (POM powders, stabilizers, chain-linking agents, and catalyst) were premixed in a Diosna R10A powder mixer, and metered into the feed zone of the extruder by way of a K-Tron Soder S210 feeder.

Tables 2a and 2b below show the formulations used and parameters for the extrusion experiments, and also the characterization results for the materials obtained.

TABLE 2a

Formulations* and parameters for extrusion experiments

| Experiment No. | Catalyst | Chain-linking agent | Screw rotation rate [rpm] | Throughput [kg/h] | Melt temperature [° C.] | Melt pressure [bar] |
|---|---|---|---|---|---|---|
| E 0 # (comparison) | 200 ppm Li(acac) | None | 20-22 | 1.2 | 214 | 0 |
| E 1 # | 200 ppm Li(acac) | 1.1% (51 mmol/kg) DiPhCO | 20-22 | 1.25 | 213 | 6 |

TABLE 2a-continued

Formulations* and parameters for extrusion experiments

| Experiment No. | Catalyst | Chain-linking agent | Screw rotation rate [rpm] | Throughput [kg/h] | Melt temperature [° C.] | Melt pressure [bar] |
|---|---|---|---|---|---|---|
| E 2 # | 200 ppm Li(acac) | 1.25% (50 mmol/kg) CBC | 20-22 | 1.0 | 213 | 1 |
| E 3 # (without vacuum) | 200 ppm Li(acac) | 1.0% 47 mmol/kg DiPhCO | 100 | 3.0 | 216 | n.d. |

*POM-OH II powder (MVR 2.16 KG/190° C. = 41 ML/10) + stabilizer package, composed of Irganox 245, Licowax C, Eurelon 975, and magnesium stearate;
the pressure at the vacuum dome of the extruder was about 0.1 bar.

TABLE 2b

Characterization of materials from extrusion experiments

| Experiment No. | MVR 2.16/190 [ml/10 min] | Charpy notched impact resistance [kJ/m$^2$] | Modulus of elasticity [MPa] | Yield stress [MPa] | Elongation [%] | Tensile stress at break [MPa] | Tensile strain at break [%] |
|---|---|---|---|---|---|---|---|
| E 0 (comparison) | 55.3 | 6.6 ± 0.6 | 2859 ± 29 | 65.7 ± 0.2 | 7.3 ± 0.1 | 64.3 ± 1.6 | 11.5 ± 3.8 |
| E 1 | 7.1 | 10.3 ± 0.7 | 2533 ± 1.3 | 63.2 ± 0.1 | 10.5 ± 0.1 | 59.1 ± 1.9 | 27.6 ± 6.5 |
| E 2 | 27.5 | 8.2 ± 1.2 | 2579 ± 10 | 64.0 ± 0.1 | 8.8 ± 0.1 | 58.8 ± 0.5 | 26.5 ± 2.1 |
| E3 | 28.7 | 7.8 + 1.05 | 2593 ± 23 | 63.9 ± 0.1 | 10.1 ± 0.1 | 58.9 ± 4.3 | 17.5 ± 9.8 |

EXAMPLES F1-F8

Solid-Phase Condensation Experiments for Chain-Extension of POM

The product E3 described above was used as starting material. This was aged in a slow-moving stream of nitrogen in a vacuum drying cabinet and specimens were removed from time to time. Table 3 below shows the results.

TABLE 3

Parameters for solid-phase condensation experiments* and characterization of the products

| Example No. | Starting material | Form | Temperature [° C.]* | Time [°h]* | MVR 2.16/190 [ml/10 min] | Charpy notched impact resistance [kJ/m$^2$] |
|---|---|---|---|---|---|---|
| F1 | E 3 | Pellets | — | 0 | 28.7 | 7.8 ± 1.05 |
| F2 | E 3 | Pellets | 150 | 24 | 7.3 | n.d. |
| F3 | E 3 | Pellets | 150 | 48 | 4.4 | n.d. |
| F4 | E 3 | Pellets | 150 | 96 | 2.9 | 12.2 ± 1.1 |
| F5 | E 3 | Tensile specimen | — | 0 | 28.6 | 8.4 ± 1.15 |
| F6 | E 3 | Tensile specimen | 150 | 24 | 14.6 | n.d. |
| F7 | E 3 | Tensile specimen | 150 | 48 | 11.7 | n.d. |
| F8 | E 3 | Tensile specimen | 150 | 96 | 8.5 | 11.3 ± 1.8 |

*in vacuum drying cabinet with slow-moving stream of nitrogen

The invention claimed is:

1. A homo- or copolyoxymethylene containing the structural unit of formula I

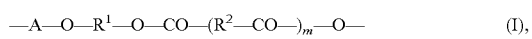
        —A—O—R$^1$—O—CO—(R$^2$—CO—)$_m$—O—   (I), where A is a radical derived from a homo- or copolyoxymethylene, R$^1$ is an alkylene radical having at least two carbon atoms, or a cycloalkylene radical, R$^2$ is a direct carbon-carbon bond, or an alkylene, cycloalkylene, arylene, or aralkylene radical, and m is 0 or 1.

2. The homo- or copolyoxymethylene as claimed in claim 1, wherein m is 0.

3. The homo- or copolyoxymethylene as claimed in claim 1, wherein R$^1$ is a radical of the formula —C$_n$H$_{2n}$—, where n is a whole number from 2 to 6.

4. The homo- or copolyoxymethylene as claimed in claim 3, wherein R$^1$ is —CH$_2$—CH$_2$—.

5. The homo- or copolyoxymethylene as claimed in claim 1, wherein the polyoxymethylene radical A has from 99.9 to 90 mol % of repeat structural units of the formula —(CH$_2$—O—)x, where x is a whole number from 100 to 10,000, and from 0.1 to 10 mol % of repeat structural units which derive from ethylene oxide, from propylene 1,2-oxide, from butylene 1,2-oxide, from butylene 1,3-oxide, from 1,3-dioxane, from 1,3-dioxolane, from 1,3-dioxepan, from 1,3,6-trioxocane, and/or from linear oligo- or polyformals.

6. The homo- or copolyoxymethylene as claimed in claim 1, wherein the polyoxymethylene radical A has from 99.9 to 90 mol % of repeat structural units of the formula —($CH_2$—O)x, where x is a whole number from 100 to 10,000, and from 0.1 to 10 mol % of repeat structural units of the formula —($CH_2$—$CH_2$—O—)$_z$ where z is a whole number which is at least 1.

7. The homo- or copolyoxymethylene as claimed in claim 1, wherein the structural elements of the formula —O—CO—($R^2$—CO—)$_m$—O— derive from chain-linking agents which are selected from the group consisting of derivatives of carbonic acid or activated urea derivatives, or from esters or half-esters of dicarboxylic acids, or from dianhydrides of tetracarboxylica acids, or from mixtures of two or more of these compounds.

8. The homo- or copolyoxymethylene as claimed in claim 7, wherein the structural elements of the formula —O—CO—($R^2$—CO—)$_m$—O— derive from diesters of carbonic acid.

9. The homo- or copolyoxymethylene as claimed in claim 7, wherein the structural elements of the formula —O—CO—($R^2$—CO—)$_m$—O— derive from diesters of oxalic acid, of the aromatic dicarboxylic acids, and/or of the aliphatic dicarboxylic acids.

10. The homo- or copolyoxymethylene as claimed in claim 9, wherein the structural elements of the formula —O—CO—($R^2$—CO—)$_m$—O— derive from dimethyl esters or diphenyl esters of oxalic acid, of isophthalic acid, of phthalic acid, of adipic acid, or of sebacic acid.

11. The homo- or copolyoxymethylene as claimed in claim 7, wherein the structural elements of the formula —O—CO—($R^2$—CO—)$_m$—O— derive from oxybix(phthalic anhydride).

12. The homo- or copolyoxymethylene as claimed in claim 7, wherein the structural elements of the formula —O—CO—($R^2$—CO—)$_m$—O— derive from carbonyl N,N'-bis(caprolactamate).

13. The homo- or copolyoxymethylene as claimed in claim 1, whose melt index (MVR value, 190° C./2.16 kg/ISO 1133) is below 10 cm³/10 min.

14. A process for the chain-extension of homo- or copolyoxymethylenes, encompassing the reaction of homo- or copolyoxymethylenes of the formula II with at least one chain-linking agent of the formula III $R^4$—A—O—$R^1$—OH (II), $R^7$—CO—($R^2$—CO—)$_m$—$R^8$ (III), where A is a radical derived from a homo- or copolyoxymethylene, $R^1$ is an alkylene radical having at least two carbon atoms, or a cycloalkylene radical, $R^2$ is a direct carbon-carbon bond or an alkylene, cycloalkylene, arylene, or aralkylene radical, $R^4$ is a radical of the formula —OH, —O—$R^5$, —O—CO—$R^6$, or —O—$R^1$—OH, where $R^1$ is defined at an earlier stage above, $R^5$ is an alkyl, cycloalkyl, aryl, or aralkyl radical, $R^6$ is hydrogen or an alkyl, cycloalkyl, aryl, or aralkyl radical, m is 0 or 1, and $R^7$ and $R^8$, independently, of one another, are alkoxy, cycloalkoxy, aryloxy, aralkyloxy, or a lactam radical bonded by way of the nitrogen atom, or where, in the case where m=1, $R^7$ and/or $R^8$ together with another carboxylic acid group of the radical $R^2$ form an anhydride or imide group.

15. The process as claimed in claim 14, wherein the reaction takes place in the presence of a catalyst which is a Lewis acid or is a Lewis base.

16. The process as claimed in claim 15, wherein the catalyst used comprises the alkali metal or alkaline earth metal salts of acetylacetonates and/or alkali metal alkoxides.

17. The process as claimed in claim 14, wherein the reaction takes place at temperatures of from 100 to 240° C. and the reaction time is from 0.5 to 60 minutes.

18. The process as claimed in claim 14, wherein the amount used of homo- or copolyoxymethylene of the formula II, per mole of chain-linking agent of the formula III, is such that the content of the end groups —O—$R^1$—OH present at the start of the chain-linkage reaction is in the range from on quarter of one mol to four mol.

19. The process as claimed in claim 14, wherein the reaction takes place at temperatures such that the reaction mixture is liquid, or such that a liquid phase forms in the reaction mixture.

20. The process as claimed in claim 14, wherein, from a mixture of compounds of the formula II and III, optionally a catalyst, and optionally of other additives, a molded structure is produced and is heated in a stream of gas and/or in a vacuum for a period such that the desired molecular weight increase has been achieved, the temperatures selected here being such that the reaction mixture is solid.

21. The homo- or copolyoxymethylene as claimed in claim 7, wherein the structural elements of the formula —O—CO—($R^2$—CO—)$_m$—O— derive from dimethyl or diphenyl carbonate.

22. The homo- or copolyoxymethylene as claimed in claim 1, whose melt index (MVR value, 190° C./2.16 kg/ISO 1133) is below 2 cm³/10 min.

23. The process as claimed in claim 15, wherein the catalyst used comprises lithium acetylacetonate or sodium acetylacetonate, and/or sodium methoxide or lithium methoxide, and/or lithium halide and the reaction takes place at temperatures of from 150 to 220° C. and the reaction time is from 0.5 to 60 minutes.

24. A method for producing moldings, fibers, films, hoses, pipes, rods, or profiles which comprises using the homo- or copolyoxymethylene as claimed in claim 1.

* * * * *